(12) United States Patent
Kanai

(10) Patent No.: US 8,645,943 B2
(45) Date of Patent: Feb. 4, 2014

(54) COMMUNICATION SYSTEM, COMMUNICATION DEVICE, AND MANAGEMENT SERVER DEVICE

(75) Inventor: Yasuaki Kanai, Yokohama (JP)

(73) Assignee: Kyocera Corporation, Kyoto (JP)

( * ) Notice: Subject to any disclaimer, the term of this patent is extended or adjusted under 35 U.S.C. 154(b) by 1116 days.

(21) Appl. No.: 12/280,774

(22) PCT Filed: Feb. 22, 2007

(86) PCT No.: PCT/JP2007/053276
§ 371 (c)(1),
(2), (4) Date: Dec. 2, 2008

(87) PCT Pub. No.: WO2007/097392
PCT Pub. Date: Aug. 30, 2007

(65) Prior Publication Data
US 2009/0187901 A1    Jul. 23, 2009

(30) Foreign Application Priority Data
Feb. 27, 2006  (JP) .................. 2006-050354

(51) Int. Cl.
*G06F 9/44*  (2006.01)
*H04M 3/00*  (2006.01)

(52) U.S. Cl.
USPC ........... 717/173; 717/168; 717/170; 717/171; 717/172; 455/419

(58) Field of Classification Search
None
See application file for complete search history.

(56) References Cited

U.S. PATENT DOCUMENTS 5,896,566 A * 4/1999 Averbuch et al. ............. 455/419
6,182,170 B1 * 1/2001 Lee et al. ...................... 710/65
6,546,492 B1 * 4/2003 Walker et al. ................. 726/3
7,305,672 B2   12/2007 Vincent
7,340,501 B2 * 3/2008 Miida et al. .................. 709/203

(Continued)

FOREIGN PATENT DOCUMENTS

JP    2000148454 A    5/2000
JP    2001-147815      5/2001

(Continued)

OTHER PUBLICATIONS

Timothy Lethbridge et al., "How Software Engineers Use Documentation: The State of the Practice", [Online], IEEE 2003, pp. 35-39, [Retrieved from Internet on Sep. 22, 2013], <https://www.cs.duke.edu/courses/cps196.1/current/classwork/Lethbridge-Singer-Forward-2003.pdf>.*
Joe Mitola, "The Software Radio Architecture", [Online], IEEE May 1995, pp. 26-38, [Retrieved from Internet on Sep. 22, 2013], <http://www.freewebs.com/mabilloo/softwareRADarch.pdf>.*
Matteo Gandetto et al., "Use of Time-Frequency Analysis and Neural Networks forMode Identification in aWireless Software-Defined Radio Approach", [Online], 2004, pp. 1778-1790, [Retrieved from Internet on Sep. 22, 2013], <http://asp.eurasipjournals.com/content/pdf/1687-6180-2004-863653.pdf>.*

(Continued)

*Primary Examiner* — Thuy Dao
*Assistant Examiner* — Ziaul A Chowdhury
(74) *Attorney, Agent, or Firm* — DLA Piper LLP (US)

(57) ABSTRACT

A communication system includes: a communication device configured to operate various functions using software programs stored in a software storage unit; a management server device configured to send an updating software program corresponding to one of the software programs; an operation information obtaining unit configured to obtain operation information of the software programs in the communication device; a determination unit configured to determine a software program that needs updating among the software programs based on the operation information obtained by the operation information obtaining unit; and an updating unit configured to replace the software program that is stored in the software storage unit and determined by the determination unit to need updating with the updating software program.

11 Claims, 7 Drawing Sheets

(56) References Cited

U.S. PATENT DOCUMENTS

| | | | |
|---|---|---|---|
| 7,403,792 B2 | 7/2008 | Takahashi | |
| 7,546,595 B1* | 6/2009 | Wickham et al. | 717/168 |
| 7,552,430 B2* | 6/2009 | Napier et al. | 717/169 |
| 7,987,459 B2* | 7/2011 | Chow et al. | 717/168 |
| 8,046,756 B2* | 10/2011 | Okutsu et al. | 717/178 |
| 8,533,703 B2* | 9/2013 | Cheng et al. | 717/172 |
| 2002/0004402 A1* | 1/2002 | Suzuki | 455/456 |
| 2002/0049839 A1* | 4/2002 | Miida et al. | 709/224 |
| 2004/0003389 A1* | 1/2004 | Reynar et al. | 717/178 |
| 2004/0015949 A1* | 1/2004 | Taylor | 717/171 |
| 2004/0239975 A1* | 12/2004 | Kawaura et al. | 358/1.14 |
| 2005/0055687 A1* | 3/2005 | Mayer | 717/173 |
| 2005/0129010 A1* | 6/2005 | Maeda et al. | 370/389 |
| 2005/0132348 A1* | 6/2005 | Meulemans et al. | 717/168 |
| 2005/0154759 A1* | 7/2005 | Hofmeister et al. | 707/104.1 |
| 2006/0089135 A1 | 4/2006 | Takahashi | |
| 2006/0106806 A1* | 5/2006 | Sperling et al. | 707/10 |
| 2006/0240849 A1* | 10/2006 | Suzuki | 455/465 |
| 2008/0148248 A1* | 6/2008 | Volkmer et al. | 717/168 |
| 2008/0222629 A1* | 9/2008 | Rauma | 717/173 |
| 2009/0138868 A1* | 5/2009 | Vanover et al. | 717/171 |
| 2009/0300595 A1* | 12/2009 | Moran et al. | 717/170 |
| 2009/0305687 A1* | 12/2009 | Baldan | 455/419 |

FOREIGN PATENT DOCUMENTS

| | | | |
|---|---|---|---|
| JP | 2003-216430 | | 7/2003 |
| JP | 2003216430 A | * | 7/2003 |
| JP | 2003256211 A | | 9/2003 |
| JP | 2003271387 A | | 9/2003 |
| JP | 2004-206260 | | 7/2004 |
| JP | 2004-297125 | | 10/2004 |
| JP | 2004355563 A | | 12/2004 |
| JP | 2005-157509 | | 6/2005 |
| KR | 1020030016746 A | | 3/2003 |
| WO | 2005069133 A1 | | 7/2005 |

OTHER PUBLICATIONS

CJ Stefanou, "A framework for the ex-ante evaluation of ERP software", [Online], 2001, pp. 204-215, [Retrieved from Internet on Sep. 22, 2013], <http://citeseerx.ist.psu.edu/viewdoc/download?doi=10.1.1.87.7004&rep=rep1&type=pdf>.*

Chinese language office action dated Sep. 29, 2011 and its English language translation for corresponding Chinese application 200780006795.5.

Korean language office action and its English language translation for corresponding Korean application 1020087021119.

Japanese language office action dated Feb. 21, 2012 and its English language translation issued in corresponding Japanese application 2006050354.

Japanese language office action dated Nov. 29, 2011 and its English language translation issued in corresponding Japanese application 2006050354.

Chinese language office action dated Jun. 4, 2012 and its English translation issued in corresponding Chinese application 200780006795.5.

Japanese language office action dated Jun. 18, 2013 and its English language translation issued in corresponding Japanese application 2012115517.

Japanese language office action dated Sep. 3, 2013 and its English language Statement of Relevance of Non-English References Pursuant to 37 CFR 1.98(a)(3)(i) issued in corresponding Japanese application 2012115517.

Japanese language office action (appeal decision) dated Oct. 22, 2013 and its English language Statement of Relevance of Non-English References Pursuant to 37 CFR 1.98(a)(3)(i) issued in corresponding Japanese application 200650354.

Chinese language office action (reexamination notification) dated Nov. 21, 2013 and its English language concise explanation issued in corresponding Chinese application 200780006795.5.

* cited by examiner

FIG. 2

DATA STRUCTURE OF OPERATION INFORMATION STORAGE UNIT

| FUNCTIONAL UNIT NAME | OPERATION RECORD | OPERATION FREQUENCY RECORD | VERSION INFORMATION |
|---|---|---|---|
| RF DRIVER UNIT | OPERATION | 10000 TIMES/1 DAY | 1.001 |
| USB CONTROL | OPERATION | 1000 TIMES/1 DAY | 1.001 |
| UART CONTROL | OPERATION | 1000 TIMES/1 DAY | 1.001 |
| SUBSCRIBER INFORMATION MANAGEMENT UNIT | OPERATION | 0 TIMES/1 DAY | 1.002 |
| DATA SERVICE UNIT | OPERATION | 1000 TIMES/1 DAY | 1.001 |
| APPLICATION A | OPERATION | 1000 TIMES/1 DAY | 1.001 |
| APPLICATION B | NO-OPERATION | 0 TIMES/1 DAY | 1.001 |
| APPLICATION C | OPERATION | 1 TIME/1 DAY | 1.001 |
| HARD CONTROLLER | OPERATION | 10000 TIMES/1 DAY | 1.001 |
| NO-VOLATILE MEMORY CONTROLLER | OPERATION | 10000 TIMES/1 DAY | 1.001 |
| GPS CONTROLLER | OPERATION | 1 TIME/1 DAY | 1.001 |
| PROTOCOL UNIT | OPERATION | 10000 TIMES/1 DAY | 1.001 |
| CAPTURE CONTROLLER | OPERATION | 10000 TIMES/1 DAY | 1.002 |
| SHORT MESSAGE SERVICE UNIT | OPERATION | 10 TIMES/1 DAY | 1.001 |
| OTHERS | OPERATION | 10000 TIMES/1 DAY | 1.001 |

FIG. 3

DATA STRUCTURE OF SOFTWARE UPDATING INFORMATION STORAGE UNIT

| FUNCTIONAL UNIT NAME VERSION INFORMATION | VERSION INFORMATION |
|---|---|
| RF DRIVER UNIT | 1.001 |
| USB CONTROL | 1.001 |
| UART CONTROL | 1.001 |
| SUBSCRIBER INFORMATION MANAGEMENT UNIT | 1.003 |
| DATA SERVICE UNIT | 1.001 |
| APPLICATION A | 1.001 |
| APPLICATION B | 1.002 |
| APPLICATION C | 1.001 |
| HARD CONTROLLER | 1.001 |
| NO-VOLATILE MEMORY CONTROLLER | 1.001 |
| GPS CONTROLLER | 1.001 |
| PROTOCOL UNIT | 1.001 |
| CAPTURE CONTROLLER | 1.003 |
| SHORT MESSAGE SERVICE UNIT | 1.001 |
| OTHERS | 1.001 |

US 8,645,943 B2

COMMUNICATION SYSTEM, COMMUNICATION DEVICE, AND MANAGEMENT SERVER DEVICE

TECHNICAL FIELD

The present invention relates to a communication system, a communication device, and a management server device capable of updating software programs used in the communication device.

This application is a national stage of International Application No. PCT/JP2007/053276, filed Feb. 22, 2007, and claims the benefit of priority under 35 USC 119 of Japanese Patent Application No. 2006-050354, filed Feb. 27, 2006, the entire contents of which are incorporated herein by reference.

BACKGROUND ART

In the past, as a technology of updating software programs operating various functions of a communication device such as a mobile telephone terminal, there is adopted a technique capable of downloading the updating software programs from a management server device through a network at any time by individual users without distributing storage mediums storing the updating software programs to the individual users (see, for example, Patent Document 1).

Specifically, the updating is performed in a sequence shown in FIG. 7. That is, an updating notification message used to notify the setting of the updating software programs is transmitted from the management server device to mobile telephone terminals (Step Sz1). When each of the mobile telephone terminals receives the updating notification message, the mobile telephone terminal reads version information indicating a version number of a software program from the software program stored in the local terminal and transmits an updating confirmation request message containing the read version information to the management server device (Step Sz2). The management server device compares the version information contained in the received updating confirmation request message and version information of the updating software program stored therein (Step Sz3). When the version information of the updating software program is a new version, the management server device transmits to the mobile telephone terminal a confirmation reply message containing information indicating updating is necessary. Alternatively, when the version information of the updating software program is an old version, the management server device transmits to the mobile telephone terminal a confirmation reply message containing information indicating that updating is not necessary (Step Sz4).

After receiving the confirmation reply message, the mobile telephone terminal determines the information contained in the confirmation reply message (Step Sz5). When the information indicates that the updating is necessary, the mobile telephone terminal transmits an updating request message to the management server device (Step Sz6). When receiving the updating request message, the management server device transmits all updating software programs to the mobile telephone terminal (Step Sz7). The mobile telephone terminal which receives the updating software programs replaces the present stored software programs by the updating software programs (Step Sz8). After the mobile telephone terminal is reset, an updating result notification indicating the updating correctly ends is transmitted to the management server device (Sz9).

Patent Document 1: Japanese Unexamined Patent Application, First Publication No. 2004-297125

DISCLOSURE OF INVENTION

Problems to be Solved by the Invention

In recent years, the number or capacity of software programs has considerably been increased with an increase in functions of the mobile telephone terminal. For that reason, there occurs a problem in that a period of time necessary to update the software programs becomes longer and thus more network resources for downloading the software programs are necessary.

The invention is finalized in order to solve the above-mentioned problem, and an object of the invention is to provide a communication system, a communication device, and a management server program capable of shortening an updating period of time upon updating software programs.

Means for Solving the Problem according to an aspect of the invention, there is provided a communication system including: a communication device configured to operate various functions using software programs stored in a software storage unit; a management server device configured to send an updating software program corresponding to one of the software programs; an operation information obtaining unit configured to obtain operation information of the software programs in the communication device; a determination unit configured to determine a software program that needs updating among the software programs based on the operation information obtained by the operation information obtaining unit; and an updating unit configured to replace the software program that is stored in the software storage unit and determined by the determination unit to need updating with the updating software program.

According to another aspect of the invention, a communication device is provided including: an operation information obtaining unit configured to obtain operation information of a software program stored therein; a transmitting unit configured to transmit the operation information obtained by the operation information obtaining unit to a management server device; a receiving unit configured to receive, from the management server device, an updating software program corresponding to a software program that is determined by the management server device based on the operation information to need updating; and an updating unit configured to update the software program using the updating software program received by the receiving unit.

According to another aspect of the invention, a management server device is provided including: a receiving unit configured to receive, from a communication device, operation information of software programs to execute various functions of the communication device; a determination unit configured to determine a software program that needs updating among the software programs based on the operation information obtained by the operation information obtaining unit; and a transmitting unit configured to transmit an updating software program corresponding to the software program that is determined by the determination unit to need updating to the communication device.

Effects of the Invention

According to the invention, it is configured that operation information of software programs in a communication device is obtained, a software program that needs updating is determined based on the operation information, and the software program that is determined to need updating is replaced with the updating software program in the communication device. With such a configuration, the software program that is determined to need updating based on the operation information is replaced upon updating the software program. Accordingly, it is possible to shorten the updating period of time.

BRIEF DESCRIPTION OF THE DRAWINGS

FIG. 2 is a diagram illustrating a data structure of an operation information storage unit according to the embodiment.

FIG. 3 is a diagram illustrating a data structure of a software updating information storage unit according to the embodiment.

DESCRIPTION OF THE REFERENCE SYMBOLS

Figure 1:
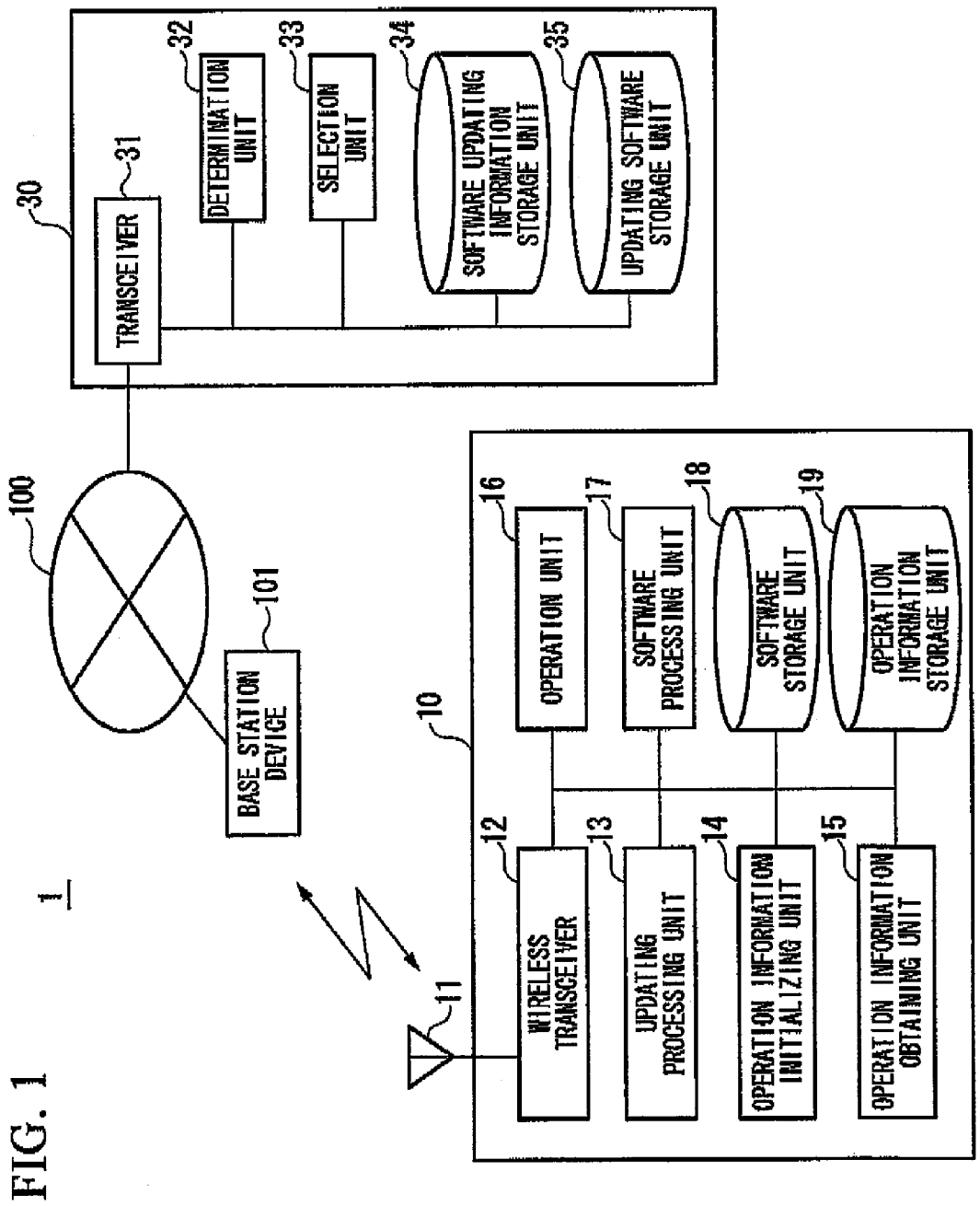
FIG. 1 is a block diagram illustrating a communication system according to an embodiment of the invention.

1: communication system
10: mobile telephone terminal
11: antenna
12: wireless transceiver
13: updating processing unit
14: operation information initializing unit
15: operation information obtaining unit
16: operation unit
17: software processing unit
18: software storage unit
19: operation information storage unit
30: management server device
31: transceiver
32: determination unit
33: selection unit
34: software updating information storage unit
35: updating software storage unit T
100: network
101: base station device

BEST MODE FOR CARRYING OUT THE INVENTION

Hereinafter, an embodiment of the invention will be described with reference to the drawings.

Hereinafter, the preferred embodiment of the invention will be described with reference to the drawings. The invention is not limited to the embodiments described below, but appropriate combination of constituent elements in the embodiments is possible, for example.

FIG. 1 is a block diagram illustrating a communication system 1 according to the embodiment.

In the communication system 1, a management server device 30 which is connected to a network 100 stores an updating software program in which a problem with a software program for operating functions of a mobile telephone terminal 10 is corrected. A base station device 101 is managed by a mobile telephone communication service provider and carries out voice communications and data communications with the mobile telephone terminal 10 through wireless signals. The network 100 is a network managed by the mobile telephone communication service provider or a network including the network managed by the mobile telephone communication service provider and the Internet connected to the network. The mobile telephone terminal 10 communicates with other mobile telephone terminals, telephone terminals, and the like through the base station device 101 managed by the mobile telephone communication service provider. In addition, the mobile telephone terminal 10 makes a connection with the management server device 30 through the base station device 101 and the network 100, upon updating a software program used to execute functions therein.

In the mobile telephone terminal 10, a wireless transceiver 12 carries out communications with the base station device 101 by the wireless signals through an antenna 11. An operation unit 16 which includes a key operation mechanism such as a 10-key numeric keypad detects key operations of a user and inputs information corresponding to each of the detected keys to other function blocks such as an updating processing unit 13 or a software processing unit 17. A software storage unit 18 stores software programs, that is, computer programs corresponding to various functions in the mobile telephone terminal 10, such as application software programs for an e-mail transmitting function and the like or driver software programs for controlling various types of hardware in the mobile telephone terminal 10.

An operation information storage unit 19 has a data structure shown in FIG. 2, for example, to store operation information and version information corresponding to various functions of the mobile telephone terminal 10 in each of the software programs. The operation information storage unit 19 stores data which include items of "a functional unit name", "an operation record", "an operation frequency record", and "version information" shown in FIG. 2, for example. In the item of "the functional unit name", names of the various functions contained by the mobile telephone terminal 10 are stored. In the item of "the operation record", "OPERATION" is stored when each function is operated. Alternatively, "NO-OPERATION" is stored when each function is not operated. In the item of "the operation frequency record", information on a predetermined number of times, for example, information on how many times each function is operated in a day is stored, as shown in FIG. 2. In the item of "the version information", a value of the version number of each of the software programs for the various functions stored in the software storage unit 18 is stored. The operation information refers to information stored in the items of "the operation record" and "the operation frequency record".

The software processing unit 17 reads a software program corresponding to each of the various functions from the software storage unit 18 and executes the read software program to operate each of the various functions. Upon executing the various functions, the software processing unit 17 records information in the items of "the operation record" and "the operation frequency record" stored in the operation information storage unit 19 which correspond to the executed software programs. When the software program is executed, "OPERATION" is recorded in the item of "the operation record" and a value of operation times stored at that time in the item of "the operation frequency record" is increased by 1.

The updating processing unit 13 receives an updating notification message indicating existence of a software program that needs updating, from the management server device through the wireless transceiver 12. In addition, the updating processing unit 13 receives an updating start instruction from the operation unit 16, when a user manipulates the operation unit 16. The updating software program is received from the management server device 30 through the base station device 101 and the network 100 and the software program stored in the software storage unit 18 which corresponds to the received updating software program is replaced with the updating software program. Moreover, the updating processing unit 13 records version information of the updating software program to the item of "the version information" of the operation information storage unit 19, when replacing the software program with the updating software program in the software storage unit 18.

An operation information initializing unit 14 initializes the information stored in "the operation record" and "the operation frequency record" corresponding to the software program, that is, records "NO-OPERATION" in "the operation record" and records the operation times as zero in "the operation frequency record", when the updating processing unit 13 replaces the software program stored in the software storage unit 18 with the updating software program. An operation information obtaining unit 15 reads all information stored in the operation information storage unit 19 and inputs the read information in the updating processing unit 13, when the updating processing unit 13 receives the updating notification message indicating the existence of the software program that needs updating from the management server device 30 through the wireless transceiver 12, or when the updating processing unit receives the updating start instruction input by the operation unit 16 in accordance with the operation of the operation unit 16 by the user.

Next, in the management server device 30, a transceiver 31 is connected to the network 100 and makes communication with the mobile telephone terminal 10. An updating software storage unit 35 stores updating software programs corresponding to the various functions of the mobile telephone terminal 10 in advance. A software updating information storage unit 34 has a data structure shown in FIG. 3, for example, and has items of "a functional unit name" and "version information". In "the functional unit name", the names of the various functions in the mobile telephone terminal 10 are stored. In "the version information", information on the version number of each of the updating software programs stored in the updating software storage unit 35 is stored.

Upon receiving information on the names of the functional units, the operation information, and the version information which are in every software program corresponding to the various functions in the mobile telephone terminal 10 and contained in an updating confirmation request message transmitted from the mobile telephone terminal 10, a determination unit 32 determines a software program that needs updating based on the information on the names of the functional units, the operation information, and the version information, the version information corresponding to the various functions stored in the software updating information storage unit 34. A selection unit 33 selects the updating software program that is determined to need updating by the determination unit 32, reads the selected updating software program from the updating software storage unit 35, and transmits the read updating software program to the mobile telephone terminal 10.

Next, operations of the communication system 1 will be described with reference to FIGS. 4 to 6.

Figure 4:
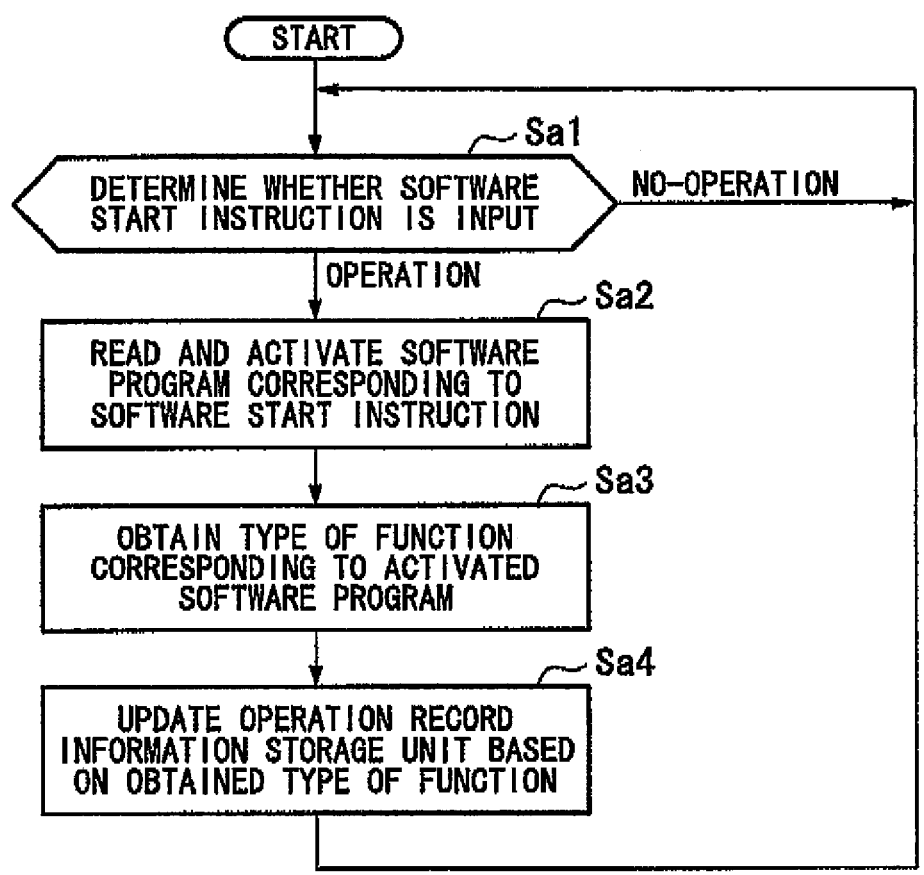
FIG. 4 is a flowchart illustrating a process of a software processing unit according to the embodiment.

FIG. 4 is a flowchart illustrating an operation of the software processing unit 17 in the mobile telephone terminal 10.

First, the software processing unit 17 determines whether or not a software start instruction is input. The software start instruction is input to the software processing unit 17 in order to activate another software program during execution of one software program, or is input by the operation unit 16 when the user operates the operation unit 16 (Step Sa1). When the software start instruction is not input, the software processing unit 17 continues to perform the operation of Step Sa1 until the software start instruction is input. Alternatively, when the software start instruction is input, the software processing unit 17 reads the software program from the software storage unit 18 and activates the read software program (Step Sa2). The software processing unit 17 detects and obtains a type of the function corresponding to the activated software program from the software program (Step Sa3), records the item of "the operation record" into "OPERATION", and adds one to the value of the operation times in the item of "the operation time record" of the operation information storage unit 19 (Step Sa4).

With the above operations, it is possible to store the operation record of the software program corresponding to each of the activated functions in the operation information storage unit 19. Moreover, it is possible to exclude the software programs that are not used or not frequently used in the mobile telephone terminal 10 by the user, from an updating process target described below.

Figure 5:
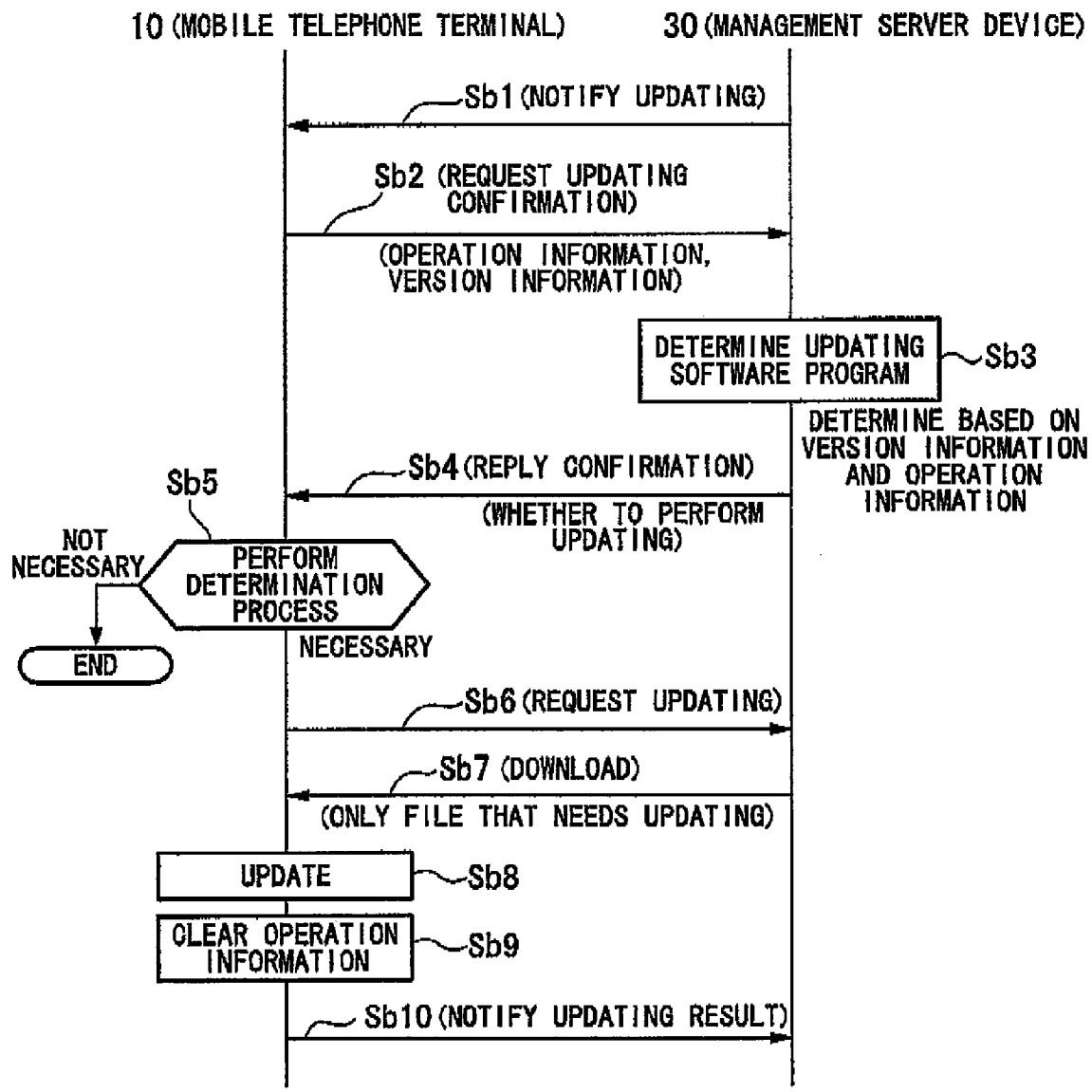
FIG. 5 is a sequence diagram illustrating a process of communication system according to the embodiment.

FIG. 5 is a sequence diagram illustrating an updating process of the software programs in the communication system 1. Before the updating process is performed, it is necessary that the updating software program is stored in the updating software storage unit 35 of the management server device 30 and the version information of the updating software program stored in the updating software storage unit 35 is stored in the software updating information storage unit 34.

First, the management server device 30 allows the transceiver 31 to transmit the updating notification message to the mobile telephone terminal through the network 100 and the base station device 101 in order to notify that the updating software program is registered (Step Sb1). The wireless transceiver 12 of the mobile telephone terminal 10 inputs the updating notification message in the updating processing unit 13, when receiving the updating notification message. The updating processing unit 13 inputs instruction information to allow the operation information obtaining unit 15 to obtain the operation information and the version information of every software program. When the instruction information is input, the operation information obtaining unit 15 reads all information stored in the items of "the functional unit name", "the operation record", "the operation frequency record", and "the version information" stored in the operation information storage unit 19, and inputs the read information in the updating processing unit 13. The updating processing unit 13 generates the updating confirmation request message containing the information input from the operation information obtaining unit 15 and allows the wireless transceiver 12 to transmit the generated updating confirmation request message to the management server device 30 through the base station device 101 and the network 100 (Step Sb2).

The transceiver 31 which receives the updating confirmation request message inputs the received updating confirmation request in the determination unit 32. When the updating confirmation request message is input, the determination unit 32 performs a software updating determination process of determining the software program that needs updating (Step Sb3).

Figure 6:
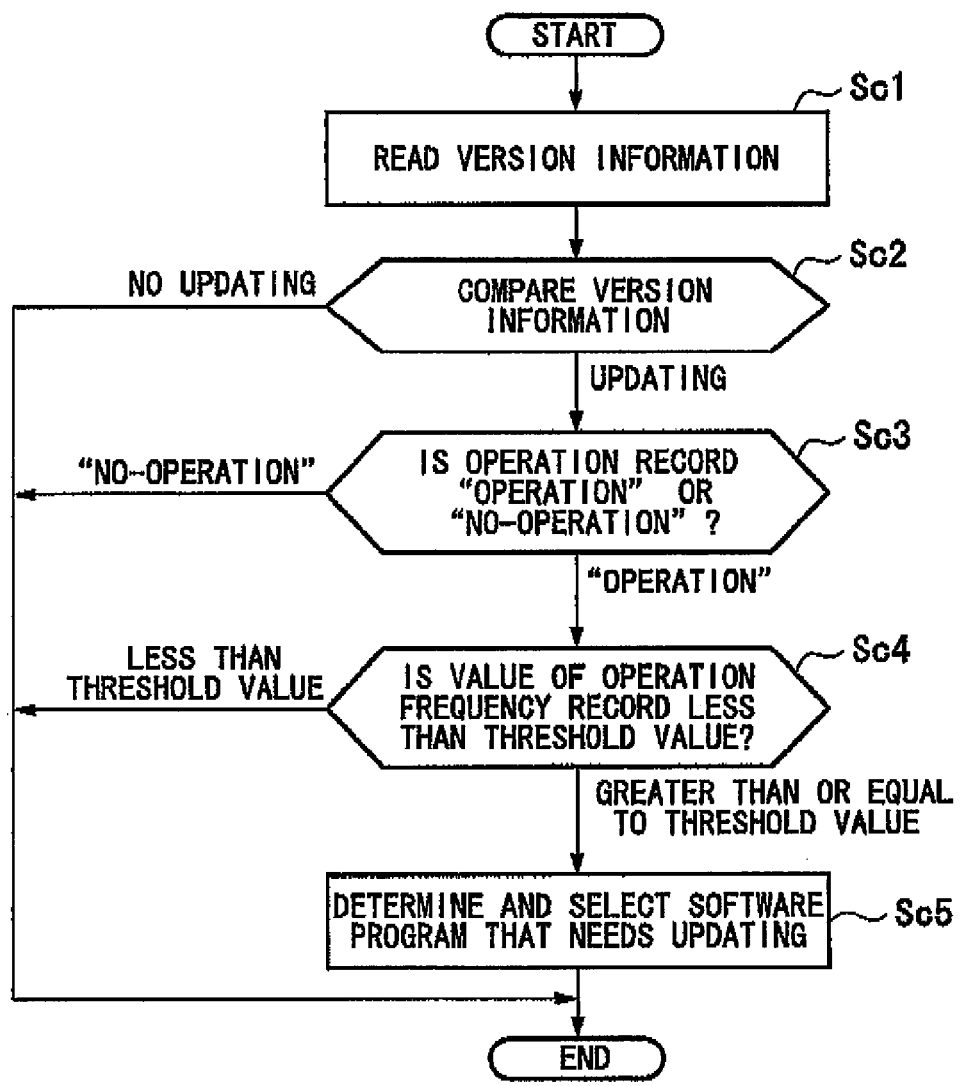
FIG. 6 is a flowchart illustrating a software updating determination process of a management server device according to the embodiment.
Figure 7:
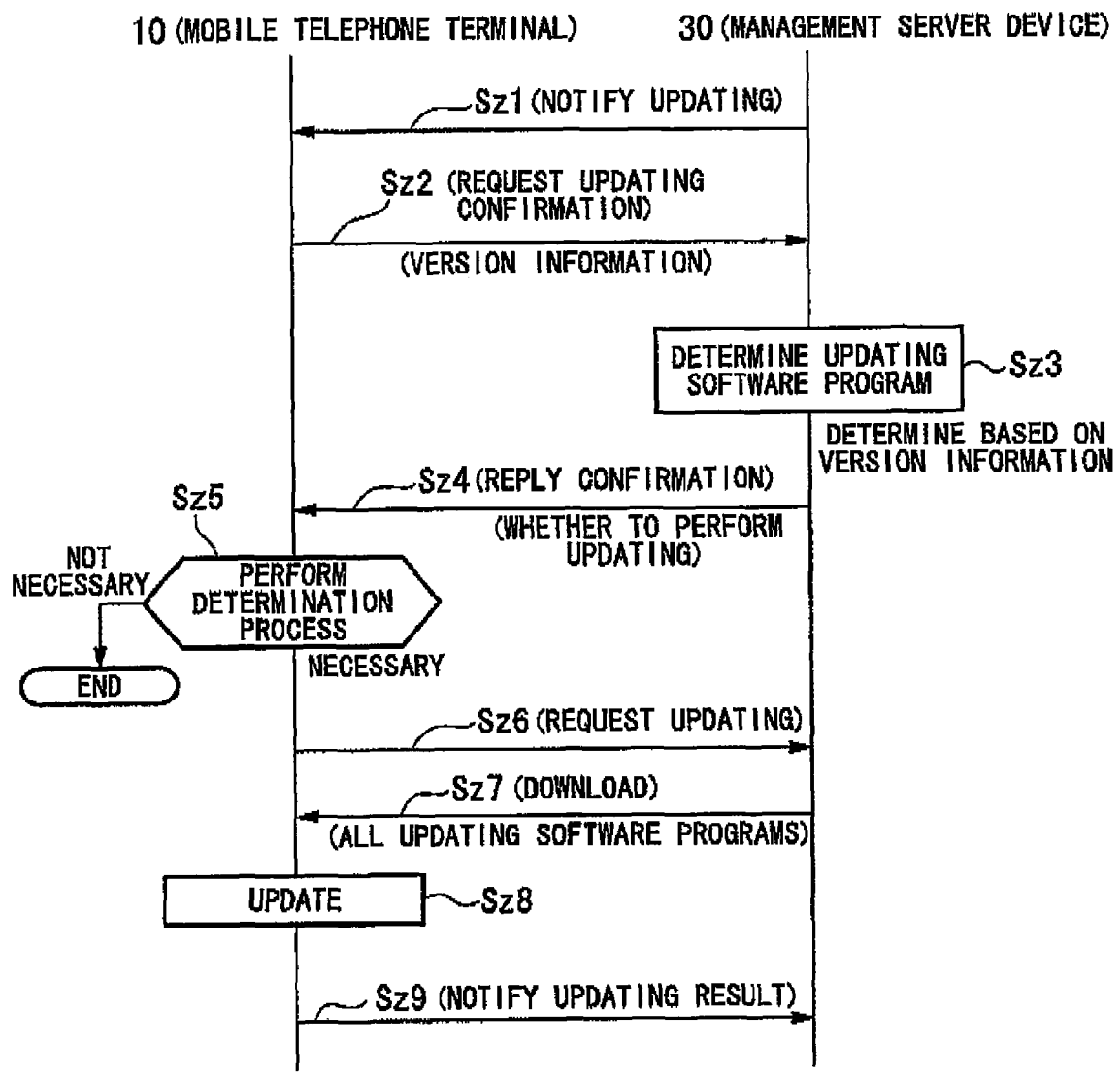
FIG. 7 is a sequence diagram illustrating an updating process according to a known technique.

The software updating determination process is performed in a sequence illustrated in FIG. 6. First, the determination unit 32 reads the version information of the updating software program in each of the various functional units from the software updating information storage unit 34 (Step Sc1). Subsequently, the determination unit 32 compares the version information of each software program contained in the input updating confirmation request message to the version information of the updating software program read from the software updating information storage unit 34, in each of the functional unit names corresponding to the respective software programs (Step Sc2). The determination unit 32 determines that it is not necessary to update the software program, when the version information read from the software updating information storage unit 34 is older than or equal to the version information contained in the updating confirmation request message. Then, it is not necessary to update the software program, and the process ends. Alternatively, the determination unit 32 determines that it is necessary to update the software program, when the version information read from the software updating information storage unit 34 is newer than the version information contained in the updating confirmation request message. Then, the next operation proceeds.

Regarding to the functional unit corresponding to the software program that is determined to need updating, the determination unit 32 determines the information in "the operation record" among the operation information contained in the updating confirmation request message (Step Sc3). When the information in "the operation record" is determined to be "NO-OPERATION", it is not necessary to update the software program. Then, the process ends. Alternatively, when the information in "the operation record" is determined to be "OPERATION", the next operation proceeds.

Regarding to the functional unit corresponding to the software program where the information in "the operation record" is determined to be "OPERATION", the determination unit 32 determines whether or not a value expressing the information in "the operation frequency record" among the operation information contained in the update confirmation request message is equal to or more than a predetermined threshold value (Step Sc4). When the value expressing the information in "the operation record" is less than the predetermined threshold value, it is determined that the updating of the software program is not necessary for the functional unit. Then, the process ends. Alternatively, when the value expressing the information in "the operation record" is greater than or equal to the predetermined threshold value, it is determined that the updating of the software program is necessary for the functional unit. Then, information in "the functional unit name" corresponding to the functional unit is input in the selection 33. The selection unit 33 selects the updating software program corresponding to "the functional unit name" and stores identification information of the selected updating software program in an inner storage area (Step Sc5).

Specifically, in the case of setting examples shown in FIGS. 3 and 4, "the subscriber information management unit", "the application B", and "the capture controller" having different version information are determined to be functional units in which the updating of the software program is necessary, by comparing version information. Next, by determining "the operation record", "NONE" indicating no updating is set in "the application B". Accordingly, "the subscriber information management unit" and "the capture controller" are determined as the functional units in which the updating of the software program is necessary. On the assumption that 10 times or more is predetermined as the threshold value, "the subscriber information management unit" having 0 times is determined as the functional unit in which the updating of the software program is not necessary. Finally, "the capture controller" is determined as the functional unit in which the updating is necessary. Then, the selection unit 33 selects "the capture controller".

Upon completion of the determination, the determination unit 32 sends a confirmation reply including information about necessity of updating to the mobile telephone terminal 10 via the transceiver 31, the base station device 101, and the network. The confirmation reply includes information of "updating necessary" when the determination unit 32 determines that at least one functional unit in which the updating of the software program is necessary is present, and the confirmation reply includes information of "updating not necessary" when the determination unit 32 determines that all the software programs do not need updating (Step Sb4).

The wireless transceiver 12 of the mobile telephone terminal 10 inputs the confirmation replay in the updating processing unit 13 when receiving the confirmation replay. The updating processing unit 13 determines information which is contained in the confirmation replay and indicates whether or not the updating is necessary (Step Sb5). When the information indicating whether or not the updating is necessary is "updating not necessary", the updating processing unit 13 ends the process. Alternatively, when the information indicating whether or not the updating is necessary is "updating necessary", the updating processing unit 13 allows the wireless transceiver 12 to transmit an updating request message to the management server device 30 through the base station device 101 and the network 100 (Step Sb6). The transceiver 31 of the management server device 30 inputs the updating request message in the selection unit 33 when receiving the updating request message. The selection unit 33 reads the identification information on the selected updating software programs stored in the inner storage area and reads the updating software program corresponding to the read identification information from the updating software storage unit 35. In addition, the selection unit 33 permits the transceiver 31 to transmit the read updating software program to the mobile telephone terminal 10 through the network 100 and the base station device 101. The mobile telephone terminal 10 downloads the updating software program from the management server device 30 (Step Sb7).

The wireless transceiver 12 of the mobile telephone terminal 10 inputs the downloaded updating software program in the updating processing unit 13. The updating processing unit 13 stores the updating software program in the inner storage area and replaces the software program corresponding to the updating software program to be stored in the software storage unit 18 with the updating software program (Step Sb8). When ending the updating, the updating processing unit 13 inputs information on the updated software program in the operation information initializing unit 14. Regarding to the operation information storage unit 19, the operation information initializing unit 14 initializes information to be stored in the item of "the operation record" of the functional unit corresponding to the information on the input software program as "NO-OPERATION" and initializes the frequency value of the information stored in the item of "the operation frequency record" as zero (Step Sb9). Subsequently, after reset, the updating processing unit 13 permits the wireless transceiver 12 to transmit an updating result notification message indicating that the updating correctly finished to the management server device 30 through the base station device 101 and the network 100 (Step Sb10).

With the above-described process, it is possible to shorten a period of time necessary to transmit the software program, since only the software program necessary for the updating can be downloaded and updated in the mobile telephone terminal 10 by determining the software program necessary for the updating bases on not only the version information but also the operation information. Accordingly, network resources can be saved. Moreover, it is possible to reduce service interruption caused by the function interruption during the updating in that the period of time necessary to replace the software program can be shortened.

The operation information is initialized only in the updated software program, and the software program which is not updated is updated when the software program is activated and the operation times are greater than equal to the threshold value. Accordingly, the updating process corresponding to the operation frequency can be performed.

In the above-described embodiment, the mobile telephone terminal 10 transmits the updating confirmation request message when the management server device 30 transmits the updating notification message. However, the invention is not limited thereto. Even when the mobile telephone terminal 10 does not receive the updating notification message, the updating process may be performed by operating the operation unit 16 by a user. Moreover, the management server device 30 may not transmit the updating notification message, and another server device may transmit the updating notification message together to multiple mobile telephone terminals.

In the above-described embodiment, the selection unit 33 selects only the updating software program corresponding to the software program necessary for the updating by the determination of the determination unit 32. However, the invention is not limited thereto. The selection unit 33 may typically select software programs which are important for operating the mobile telephone terminal 10. Moreover, according to the value of the operation frequency information, the software program having a high frequency is first updated and the software program having a low frequency is updated at midnight at which the user of the mobile telephone terminal 10 uses less.

In the above-described embodiment, the management server device 30 determines whether or not the updating is performed. However, the mobile telephone terminal 10 may receive information on the updating software from the management server device 30 and may determine whether or not the updating to the mobile telephone terminal 10 is performed to receive only the software program necessary for the updating from the management server device 30 based on the determination result.

When the mobile telephone terminal 10 determines the necessity of updating, the mobile telephone terminal 10 may freely perform the determination without additional reception of the updating notification message from the management server device 30 or the operation of the operation unit 16 by the user whenever the software program is activated. In addition, when the software program is determined to need updating, the mobile telephone terminal 10 may receive the related updating software program from the management server device 30. Moreover, the mobile telephone terminal 10 may further include a notification unit which notifies a message necessary for the software updating to the user, when a software program determined to need updating is present in the management server device 30 or the mobile telephone terminal 10. In this case, the notification unit is configured to notify updating information to the user through a screen display, a voice, or the like in order to recognize that the software program to be updated is present, when the updating information on the software program that needs updating is received from the management server device 30. Then, when the user recognizes that the software program needs updating by the notification, the user operates the operation unit 16 and selects the software program that needs updating. In addition, when the software program that needs updating is selected, it may be configured to receive the related updating software program from the management server device 30.

In the above-described embodiment, the management server device 30 includes the software updating information storage unit 34 which stores the version information in each of the functional unit names, but the invention is not limited thereto. Only the functional unit name corresponding to the software program that needs updating may be stored in the software updating information storage unit 34. In addition, the involved software program is determined and selected based on only the operation information without determination of the version information.

In the above-described embodiment, the software processing unit 17 stores the operation information on the software programs in the operation information storage unit 19 and the operation information obtaining unit IS reads the related information to obtain the operation information on the software program. However, the invention is not limited thereto. Any configuration is possible as long as the operation information obtaining unit 15 obtains the operation information.

In the above-described embodiment, the operation times are recorded as the information in "the operation frequency record" of the operation information storage unit 19. However, the invention is not limited thereto. A cumulative time of the operations may be used. Moreover, as the information in "the operation frequency record", a use record of each application or the like may be recorded.

In the above-described embodiment, the mobile telephone terminal 10 is configured to receive only the software program that needs updating from the management sever device 30. However, the software program may be updated by receiving all the updating software programs recorded in the management server device 30, determining the software program that needs updating based on the operation information, extracting the updating software program corresponding to the software program that is determined to need updating among the received updating software programs, and replaying the software program with the updating software program. Even in this case, it is possible to eliminate a possibility of the service interruption caused by the function interruption during the updating in that it is possible to shorten the period of time necessary to replace the software program.

An operation information obtaining unit according to the invention corresponds to the operation information obtaining unit 15 of the mobile telephone terminal 10 and a determination unit corresponds to the determination unit 32 of the management server device 30. A selection unit provided in an updating unit according to the invention corresponds to the selection unit 33 of the management server device 30. A downloading unit corresponds to the wireless transceiver 12 and the updating processing unit 13 of the mobile telephone terminal 10. A replacing unit corresponds to the updating processing unit 13. A notification information transmitting unit corresponds to the determination unit 32 and the transceiver 31 of the management server device 30. A notification information receiving unit corresponds to the wireless transceiver 12 and the updating processing unit 13 of the mobile telephone terminal 10. An operation unit according to the invention corresponds to the operation unit 16 of the mobile telephone terminal 10. An operation information initializing unit corresponds to the operation information initializing unit 14. An operation information storage unit corresponds to the operation information storage unit 19.

A transmitting unit and a receiving unit of the communication device according to the invention correspond to the wireless transceiver 12. The operation information obtaining unit corresponds to the operation information obtaining unit 15 and the updating unit corresponds to the updating processing unit 13.

A transmitting unit and a receiving unit of the management server device according to the invention correspond to the transceiver 31. A determination unit corresponds to the determination unit 32 and a selection unit corresponds to the selection unit 33.

In the above-described embodiment, the mobile telephone terminal 10 is configured to download the updating software program from the management server device 30 through the network 100 and the base station device 101 by wireless communication. However, the invention is not limited thereto. For example, it may be configured to download the updating software program from the management sever device 30 through the network 100 by wired communication.

In the above-described embodiment the mobile telephone terminal 10 is used as the communication device. However, the invention is not limited to the above-described embodiment. For example, other communication devices such as a personal computer PC may be used.

The above-mentioned mobile telephone terminal 10 and the management server device 30 have a computer system therein. Processes in functional blocks of the above-mentioned mobile telephone terminal 10 and the management server device 30 are stored in a recording medium which can be read in the form of computer programs by computers, and the computer programs are read and executed by the computers to perform the above processes. The recording medium which can be read by the computer refers to a magnetic disk, a magnetic optical disk, a CD-ROM, a DVD-ROM, a semiconductor memory, etc. The computer programs may be transmitted to a computer through a communication line and the computer receiving the computer programs may be configured to execute the computer programs.

According to the invention, the software programs may be firmware stored in the hardware of the mobile telephone terminal 10 and/or the management server device 30.

The invention may be put into practice by a software updating method of replacing the software program used in the communication device (the mobile telephone terminal 10) with the updating software program transmitted from the management server device 30. In the software updating method, the operation information on the software program in the communication device is obtained, the software program that needs updating is determined on the basis of the obtained operation information, and the software program may be replaced in the communication device with the updating software program which is transmitted from the management server device 30 and corresponds to the software program that was determined to need updating.

The invention may be put into practice by a program that is executed in a control computer (computer system) of a communication device (the mobile telephone terminal 10) that receives updating software programs from the management server device 30 transmitting the updating software programs and updates the software programs stored therein. This program includes a step of obtaining operation information on the software programs, a step of transmitting the obtained operation information to the management server device, a step of receiving the updating software programs corresponding to the software programs determined to need updating by the management server device based on the operation information from the management server device, and a step of replacing the software programs with the received updating software programs. The program is executed by the control computer of the communication device.

The invention may be put into practice by a program that is executed by a control computer (computer system) of the management server device 30 that transmits updating software programs corresponding to software programs for operating various functions of a communication device (the mobile telephone terminal 10). This program includes a step of receiving operation information on the software programs from the communication device, a step of determining the software programs that need updating among the software programs based on the received operation information, a step of selecting the updating software program, and a step of receiving a request message from the communication device and transmitting the updating software program corresponding to the software program determined to need updating. The program is executed in the control computer of the management server device 30.

The invention claimed is:

1. A communication system comprising:
a processor;
a communication device configured to operate various functions using software programs stored in a software storage unit;
a management server device configured to send an updating software program corresponding to one of the software programs;
an operation information obtaining unit configured to obtain operation information of the software programs, which corresponds to the updating software program, in the communication device including a number of operations of the software program, frequency of operations of the software program, and cumulative time of the operations of the software program when receiving an updating notification message about the updating software program from the management server device;
a determination unit configured to determine a software program that needs updating among the software programs based on the operation information obtained by the operation information obtaining unit; and
an updating unit configured to replace the software program that is stored in the software storage unit and determined by the determination unit to need updating with the updating software program,
wherein a degree of updating necessity is preset to each of the updating software programs, and the determination unit is configured to determine a software program that needs updating based on, in addition to the operation information, the degree of updating necessity preset to each of the updating software programs.

2. The communication system according to claim 1, wherein the determination unit is configured to determine a software program that needs updating based on, in addition to the operation information, version number information of the software program and version number information of the updating software program.

3. The communication system according to claim 1, wherein the updating unit comprises:
a downloading unit provided in the communication device, and configured to receive the updating software program sent from the management server device upon determination by the determination unit that updating is necessary; and
a replacing unit provided in the communication device, and configured to replace the software program stored in the software storage unit and corresponding to the updating software program received by the downloading unit with the updating software program.

4. The communication system according to claim 3, wherein the updating unit comprises a notification unit provided in the communication device, and
configured to notify, when there is a software program that is determined by the determination unit to need updating, that updating of the software program is necessary, and the downloading unit is configured to receive the updating software program from the management server device when receiving a command indicating download permission from an operation unit that is provided in the communication device, the command being input by an operation of a user to the operation unit, after being notified by the notification unit.

5. The communication system according to claim 1, wherein the updating unit comprises an operation information initializing unit configured to initialize, when a software program is updated, the operation information of the updated software program.

6. The communication system according to claim 1, wherein the operation information obtaining unit is configured to obtain information about an operation record of the software programs in the communication device as the operation information and to record the operation information that is obtained in an operation information storage unit, and the determination unit is configured to determine a software program that needs updating based on the operation information stored in the operation information storage unit.

7. The communication system according to claim 6, wherein the determination unit is configured to determine a software program to need updating when information regarding the operation record of the software program indicated by the operation information stored in the operation information storage unit matches a predetermined condition.

8. The communication system according to claim 6, wherein the operation record is whether or not the software program is operated, a number of operations of the software program, frequency of operations of the software program, or cumulative time of the operations of the software program.

9. The communication system according to claim 1, wherein, when there are plural software programs that are determined by the determination unit to need updating, the updating unit is configured to cause the communication device to update the software programs using the updating software programs corresponding thereto depending on priority of the operation information.

10. A communication device comprising:
a central processing unit (CPU) and a storage memory;
an operation information obtaining unit configured to obtain operation information of a software program stored therein including a number of operations of the software program, frequency of operations of the software program, and cumulative time of the operations of the software program when receiving an updating notification message about an updating software program corresponding to the software program stored therein from a management server device, wherein a degree of updating necessity is preset to each of the updating software programs;

a transmitting unit configured to transmit the operation information obtained by the operation information obtaining unit to the management server device;

a receiving unit configured to receive, from the management server device, an updating software program corresponding to a software program that is determined by the management server device based on the operation information and the degree of updating necessity preset to each of the updating software programs to need updating; and an updating unit configured to update the software program using the updating software program received by the receiving unit.

11. A management server device comprising:

a processor for executing a transmitting unit configured to transmit an updating notification message about an updating software program corresponding to a software program stored in a communication device to the communication device;

a receiving unit configured to receive, from the communication device, operation information of software programs, which correspond to the updating software program, including a number of operations of the software program, frequency of operations of the software program, and cumulative time of the operations of the software program; and a determination unit configured to determine a software program that needs updating among the software programs based on the operation information received by the receiving unit, wherein the transmitting unit is configured to transmit an updating software program corresponding to the software program that is determined by the determination unit to need updating to the communication device, wherein a degree of updating necessity is preset to each of the updating software programs, and the determination unit is configured to determine a software program that needs updating based on, in addition to the operation information, the degree of updating necessity preset to each of the updating software programs.

* * * * *